No. 874,889. PATENTED DEC. 24, 1907.
E. HAHN.
SAUSAGE STUFFING MACHINE.
APPLICATION FILED MAY 31, 1906.

3 SHEETS—SHEET 1.

WITNESSES
Jas J Maloney

INVENTOR
EDMUND HAHN
BY

No. 874,889. PATENTED DEC. 24, 1907.
E. HAHN.
SAUSAGE STUFFING MACHINE.
APPLICATION FILED MAY 31, 1906.
3 SHEETS—SHEET 3.
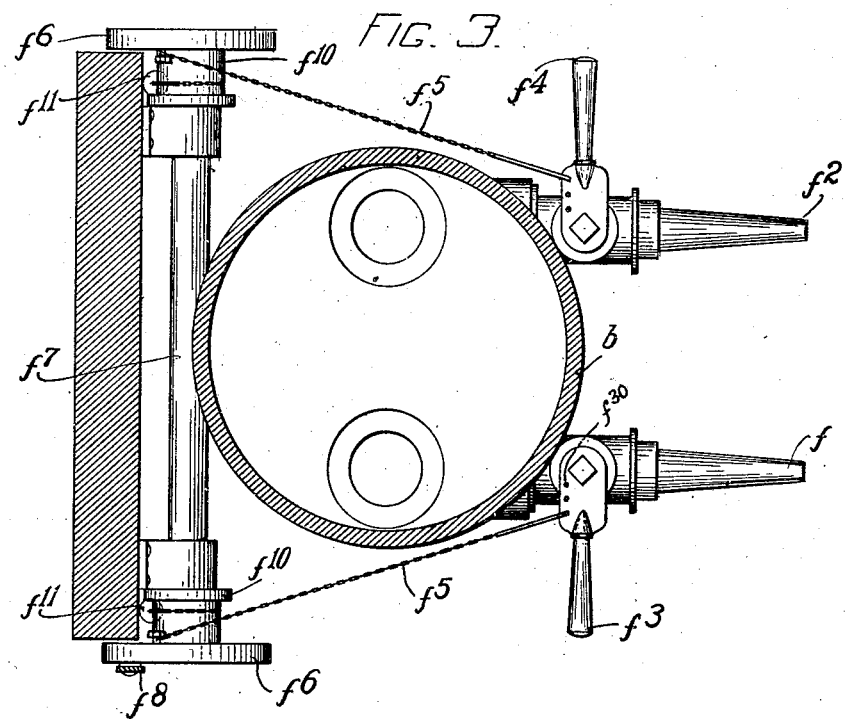
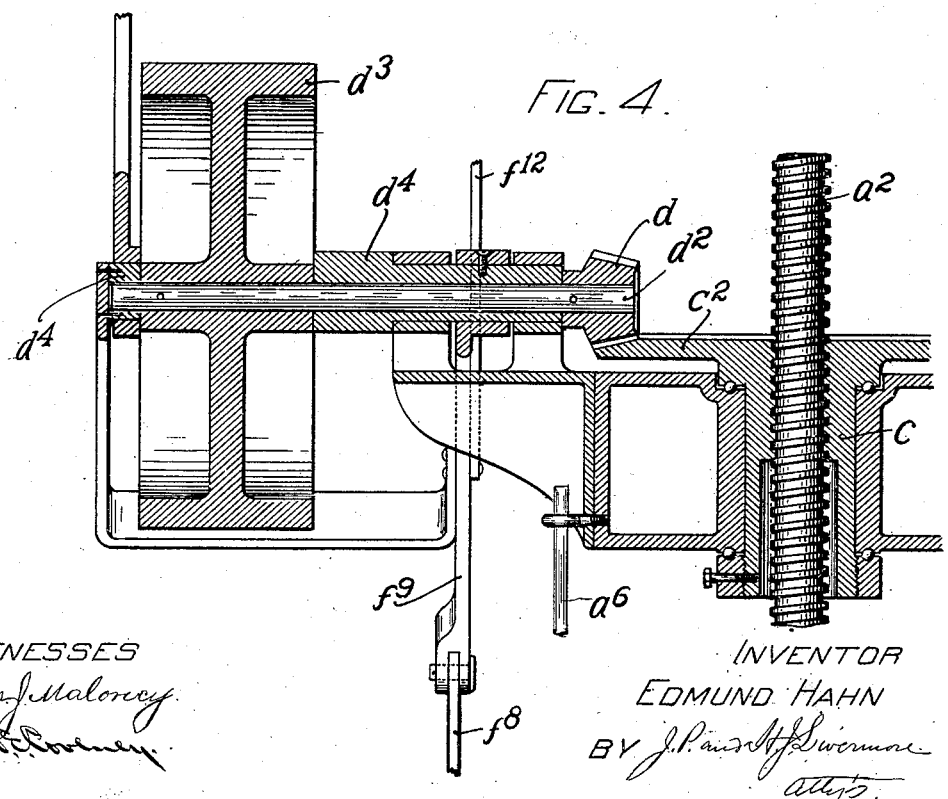
WITNESSES
Jas. J. Maloney
INVENTOR
EDMUND HAHN
BY
attys.

UNITED STATES PATENT OFFICE.

EDMUND HAHN, OF EVERETT, MASSACHUSETTS.

SAUSAGE-STUFFING MACHINE.

No. 874,889.

Specification of Letters Patent.

Patented Dec. 24, 1907.

Application filed May 31, 1906. Serial No. 319,427.

*To all whom it may concern:*

Be it known that I, EDMUND HAHN, a citizen of the United States, residing in Everett, in the county of Middlesex and State of Massachusetts, have invented an Improvement in Sausage-Stuffing Machines, of which the following description, in connection with the accompanying drawings, is a specification, like letters on the drawings representing like parts.

The present invention relates to a sausage stuffing machine, and is embodied in a machine of that type in which the plunger which presses the meat out of the meat cylinder is mechanically operated, as by a screw plunger, the construction to which the features of this invention are applied being substantially the same as that shown and described in United States Patent No. 736,720, granted to me August 18, 1903. In a machine of this type, the feed movement of the plunger in expressing the meat is intermittent, being entirely stopped when the valve controlling the meat is closed, it being practicable, therefore, to obtain a more regular and even pressure, so that there is less liability of breaking the skins.

The present invention is embodied in automatic devices for simplifying the control of the feed, the arrangement being such that the plunger will be automatically stopped when it reaches the bottom of the meat cylinder, while the reverse movement of the plunger not only produces a tipping of the meat cylinder to render the same accessible after the plunger has emerged therefrom, but also operates an automatic shipper to stop the movement when the plunger has reached its uppermost position. The intermittent feed of the plunger is controlled by the manipulation of the faucets themselves, and, where two or more faucets are used to admit of two or more men working at the same machine, the feed will continue so long as either faucet remains open, but will be stopped when both faucets are closed.

Figure 1:
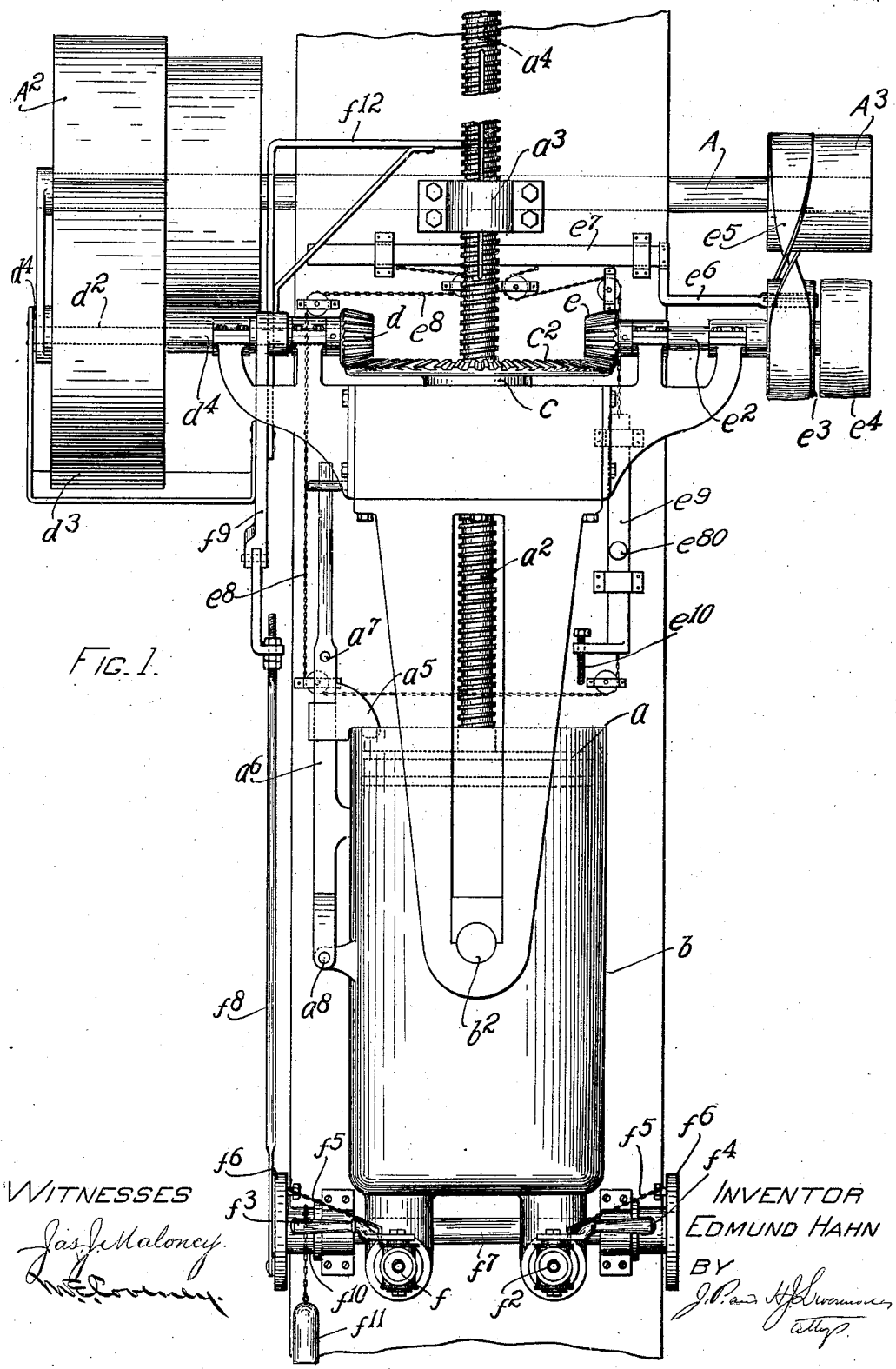
Figure 2:
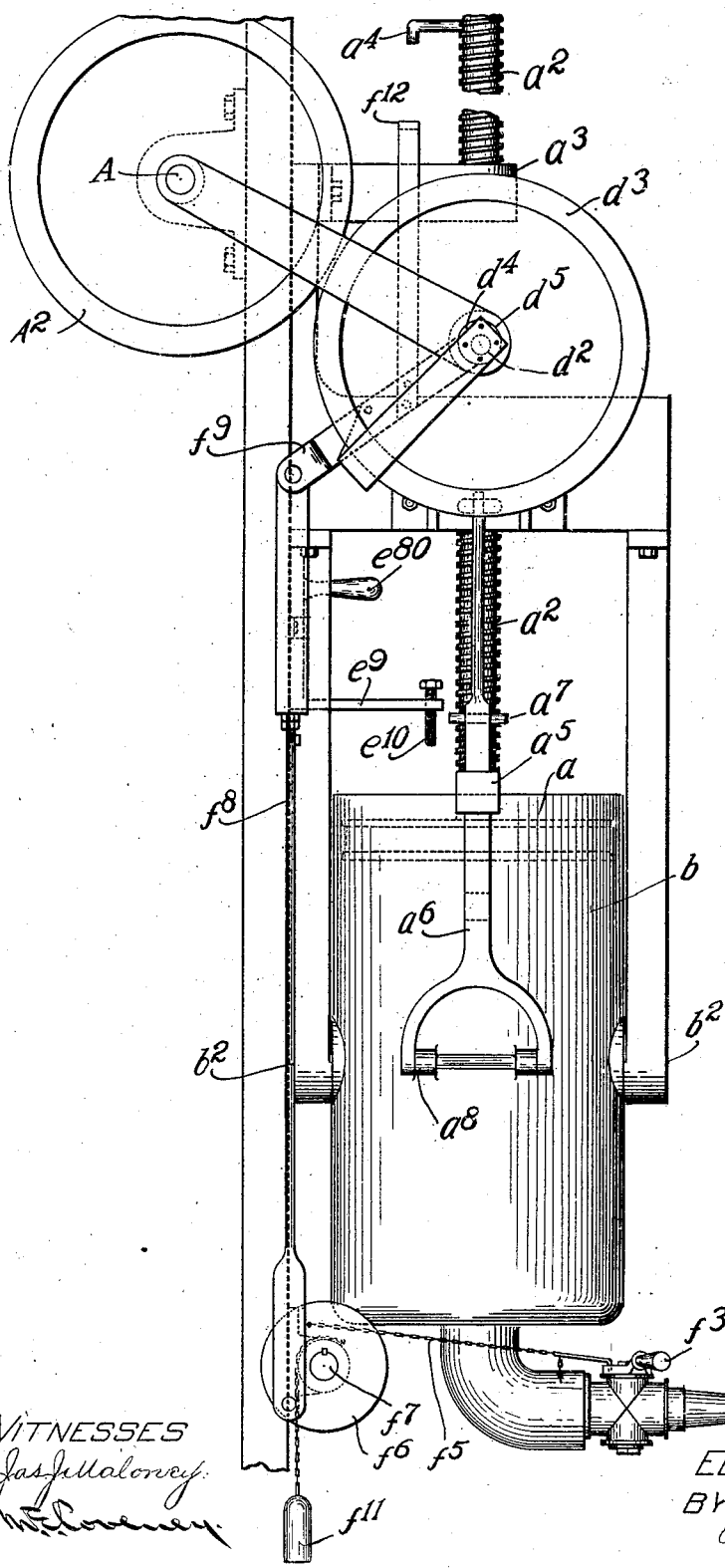

Figure 1 is a front elevation of a sausage stuffing machine embodying the invention; and Fig. 2 is a side elevation of the same; Fig. 3 is a horizontal section taken on a plane just above the faucets; and Fig. 4 is an enlarged detail in vertical section illustrating the plunger driving mechanism.

The plunger $a$ which fits and reciprocates in the meat cylinder $b$ is provided with a threaded plunger rod $a^2$ which is prevented from rotation during its upward and downward movement by means of a feather or spline working in a bearing $a^3$. The upward and downward movement of the plunger is produced by means of a geared driving member $c$, the gear $c^2$ of which is in mesh with beveled gears $d$ and $e$ mounted, respectively, on countershafts $d^2$ and $e^2$, which are capable of being alternately driven. The member $c$ is provided with a thread, as indicated in Fig. 4, which coöperates with the thread on the plunger rod $a^2$ so that the rotating movement of the member $c$ produces a longitudinal movement of the piston $a$.

In accordance with the invention, the active movement of the piston $a$, that is to say, the movement which forces the meat out through the faucet nozzles $f$, $f^2$, is provided for by means of a friction drive, the main shaft A having a friction pulley $A^2$, which is arranged to coöperate with a friction pulley $d^3$ mounted on the countershaft $d^2$, the said shaft being provided at one end with an eccentric bearing box $d^4$, which is capable of sufficient rotating movement in an eccentric opening $d^5$ to throw the pulley $d^3$ into and out of engagement with the pulley $A^2$. A very slight movement is sufficient to engage and disengage the pulleys, and this movement may be imparted directly from the faucet, so that after a skin has been applied to the nozzle, the machine will be started by the act of turning the faucet to open the meat outlet. In the construction shown, the meat cylinder is provided with two faucets, and each of the faucet handles $f^3$ and $f^4$ is connected by means of a chain $f^5$ with a disk $f^6$, there being two of the disks mounted at opposite ends of a rock shaft $f^7$. A manipulation of either faucet to turn on the meat supply, will, therefore, rock the shaft in the direction necessary to start the machine, although either faucet may be turned off, without reversing the shaft, on account of the chain connection.

In order to control the feed movement of the plunger through the agency of the rock shaft, one of the disks $f^6$ is connected at a point concentric to its axis with a rod $f^8$ which, in turn, is connected with an arm $f^9$ which connects with the eccentric bearing box for the shaft $d^2$, so as to throw the pulley $d^3$ into and out of engagement with the pulley $A^2$ in accordance with the direction of movement of the rod $f^7$.

The disengagement of the pulleys is provided for by means of a yielding force, so as to admit of the chain connection with the faucets, the purpose of which has been previously described.

In the construction shown the rock shaft $f^7$ is provided with a drum $f^{10}$ which has connected therewith a weight $f^{11}$.

In order to stop the plunger when it reaches the bottom of the meat cylinder, so as to prevent any straining of the gears, the machine is provided with an automatic throw-off which is herein shown as coöperating directly with the arm $f^9$, which is provided with an upward extension $f^{12}$ having an offset portion which stands in the path of a stop $a^4$ connected with the plunger rod $a^2$. As the plunger approaches the bottom of the meat cylinder, the member $a^4$ comes in contact with the extension $f^{12}$, thus positively forcing down the arm $f^9$ and the rod $f^8$, and disengaging the friction pulleys, and, at the same time, closing the faucets.

The reverse movement to restore the plunger after the meat cylinder is empty, is a continuous movement, so that no intermittent feeding mechanism is required in this connection. In the construction shown, the countershaft $e^2$ is provided with fast and loose pulleys $e^3$ and $e^4$ adapted to be alternately connected with a pulley $A^3$ on the main driving shaft, the belt $e^5$ being under the control of a belt shifter $e^6$ of any suitable or usual construction. This belt shifter, in accordance with the invention, is automatically operated at the end of the upward movement of the plunger, so that after the upward movement has been started by the attendant by pulling down the handle $e^{80}$, the machine will take care of itself. As herein shown, the shifter $e^6$ is connected with a sliding rod $e^7$ which is acted upon by a chain $e^8$ passing over a series of pulleys, and being finally connected with a vertically movable rod $e^9$ which is provided with an adjustable screw $e^{10}$ in the path of the plunger $a$. When the said plunger $a$ reaches the stop $e^{10}$, it will push the rod $e^9$ upward, pulling on the chain $e^8$, and causing a movement of the shifter rod $e^7$ to the right, to throw the bar from the fast to the loose pulley. The upward movement of the plunger also results in the tipping of the meat cylinder, which is shown as supported on trunnions $b^2$ on the frame, so that the top of the cylinder becomes accessible for filling, and also out of the way of the plunger itself. As herein shown, the cylinder $b$ is latched in position by means of a latch member $a^5$, which is capable of sliding on a rod $a^6$, the latch member being engaged by the plunger $a$, in its upward movement, and lifted so as to disengage it from the edge of the meat cylinder. A continued movement of the latch member $a^5$ carries it up the rod $a^6$, and causes it to engage a projection $a^7$, so that the continued movement of the member $a^5$ produces an upward movement of the rod $a^6$. The said rod $a^6$ is connected at $a^8$ with a lug on the meat cylinder, whereby such upward movement of the rod will tip the meat cylinder on its trunnions, so that the top will project laterally beyond the plunger itself.

It is practicable, in accordance with the invention, to vary the plunger pressure, by varying the frictional grip of the pulleys, and, in the construction shown, the faucets $f^3$ are provided with a series of openings $f^{30}$ (Fig. 3) at different distances from the axes of the valves, it being obvious that the extent of movement of the shaft $f^7$ imparted through the chain is thus varied, correspondingly varying the frictional grip of the pulleys.

Claims.

1. In a sausage stuffing machine, a meat cylinder; a plunger working therein to express the meat therefrom; a stuffing nozzle leading from the meat cylinder; a faucet controlling said nozzle; a controlling device connected with the machine and operated in response to the opening or closing of said faucet to start or stop the plunger; and independent means also connected with the machine for controlling the backward movement of the plunger.

2. In a sausage stuffing machine, a meat cylinder provided with a plurality of stuffing nozzles; a faucet for each nozzle; a mechanically operated plunger working in the cylinder; a controlling device for said plunger connected with the machine; an automatic member connected with said device to operate the same and stop the plunger; and flexible connections between said member and each faucet, whereby said member is operated by opening the faucet to start the plunger.

3. The combination with the meat cylinder; of a plurality of stuffing nozzles leading therefrom; a device coöperating with each stuffing nozzle to control the operation thereof; an expressing plunger working in the cylinder; means connected with the machine for starting the forward movement of said plunger in response to the opening of any of the nozzle controlling devices; and independent means also connected with the machine for stopping the forward movement of said plunger when all the nozzle controlling devices are closed.

4. The combination with the meat cylinder; of the expressing plunger working therein; a driving member for said plunger; means connected with the machine for controlling the operation of said driving member; a rock shaft suitably mounted on the machine and connected with said controlling means and being provided with a yielding force as that of a weight or spring, the tendency of which is to stop the plunger; a plurality of stuffing nozzles leading from the meat cylinder; a faucet for each nozzle; and a flexible connecting member extending from said nozzle to said rock shaft substantially as and for the purpose described.

5. The combination with the meat cylinder; of the plunger working therein; the friction pulley mounted on the machine for driving said plunger; the rock shaft connection mounted on the machine for controlling said friction pulley; a stuffing nozzle leading from the cylinder; a faucet therefor; a flexible connection between said faucet and said rock shaft; and means for varying the point of connection between said faucet and said flexible connection.

In testimony whereof, I have signed my name to this specification in the presence of two subscribing witnesses.

EDMUND HAHN.

Witnesses:
   H. J. LIVERMORE,
   M. E. COVENEY.